(12) United States Patent
Martinez et al.

(10) Patent No.: US 11,568,576 B1
(45) Date of Patent: Jan. 31, 2023

(54) GENERATION OF SYNTHETIC IMAGE DATA

(71) Applicant: Amazon Technologies, Inc., Seattle, WA (US)

(72) Inventors: Aleix Margarit Martinez, Seattle, WA (US); Raghu Deep Gadde, Bellevue, WA (US); Qianli Feng, Columbus, OH (US); Alexandru Indrei, Bothell, WA (US); Gerard Gjonej, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 70 days.

(21) Appl. No.: 17/117,784

(22) Filed: Dec. 10, 2020

(51) Int. Cl.
  *G06T 11/00* (2006.01)
  *G06T 7/11* (2017.01)
  *G06K 9/62* (2022.01)
  *G06T 7/70* (2017.01)

(52) U.S. Cl.
  CPC ............ *G06T 11/00* (2013.01); *G06K 9/6217* (2013.01); *G06K 9/6267* (2013.01); *G06T 7/11* (2017.01); *G06T 7/70* (2017.01); *G06T 2207/10016* (2013.01); *G06T 2207/20084* (2013.01); *G06T 2207/20132* (2013.01)

(58) Field of Classification Search
  CPC ........ G06V 20/64; G06V 20/20; G06V 10/82; G06F 30/23; G06K 9/6262; G06K 9/6274; G06N 3/0454; G06N 3/08; G06N 3/084; G06T 7/13; G06T 7/73; G06T 7/80; G06T 19/20; G06T 2207/20081
  See application file for complete search history.

(56) References Cited

U.S. PATENT DOCUMENTS

| | | | |
|---|---|---|---|
| 11,367,188 B2 * | 6/2022 | Kearney | A61B 6/5294 |
| 2019/0102601 A1 * | 4/2019 | Karpas | G06N 3/084 |
| 2022/0138506 A1 * | 5/2022 | Elenes | G06N 3/088 382/157 |

* cited by examiner

*Primary Examiner* — John B Strege
(74) *Attorney, Agent, or Firm* — K&L Gates LLP

(57) ABSTRACT

Techniques are generally described for generation of photorealistic synthetic image data. A generator network generates first synthetic image data. A first class of image data represented by a first portion of the first synthetic image data is detected and the first portion is sent to a first discriminator network. The first discriminator network generates a prediction of whether the first portion of the first synthetic image data is synthetically generated. A second class of image data represented by a second portion of the first synthetic image data is detected and the second portion is sent to a second discriminator network. The second discriminator network generates a prediction of whether the second portion of the first synthetic image data is synthetically generated. The generator network is updated based on the predictions of the discriminators.

20 Claims, 7 Drawing Sheets

GENERATION OF SYNTHETIC IMAGE DATA

BACKGROUND

Generation of high quality photographs, such as in the context of fashion photography and/or product photography often requires shooting in a professional photography studio with proper lighting and photography equipment. Such high quality photographs can help individuals make purchase decisions. Customers make purchase decisions not only on how the product looks, but often on how the product appears in the relevant context. For example, how a garment fits people of different sizes or body types, how a piece of furniture appears in the context of a furnished room, or how a product looks in a specific context.

DETAILED DESCRIPTION

Figure 1:
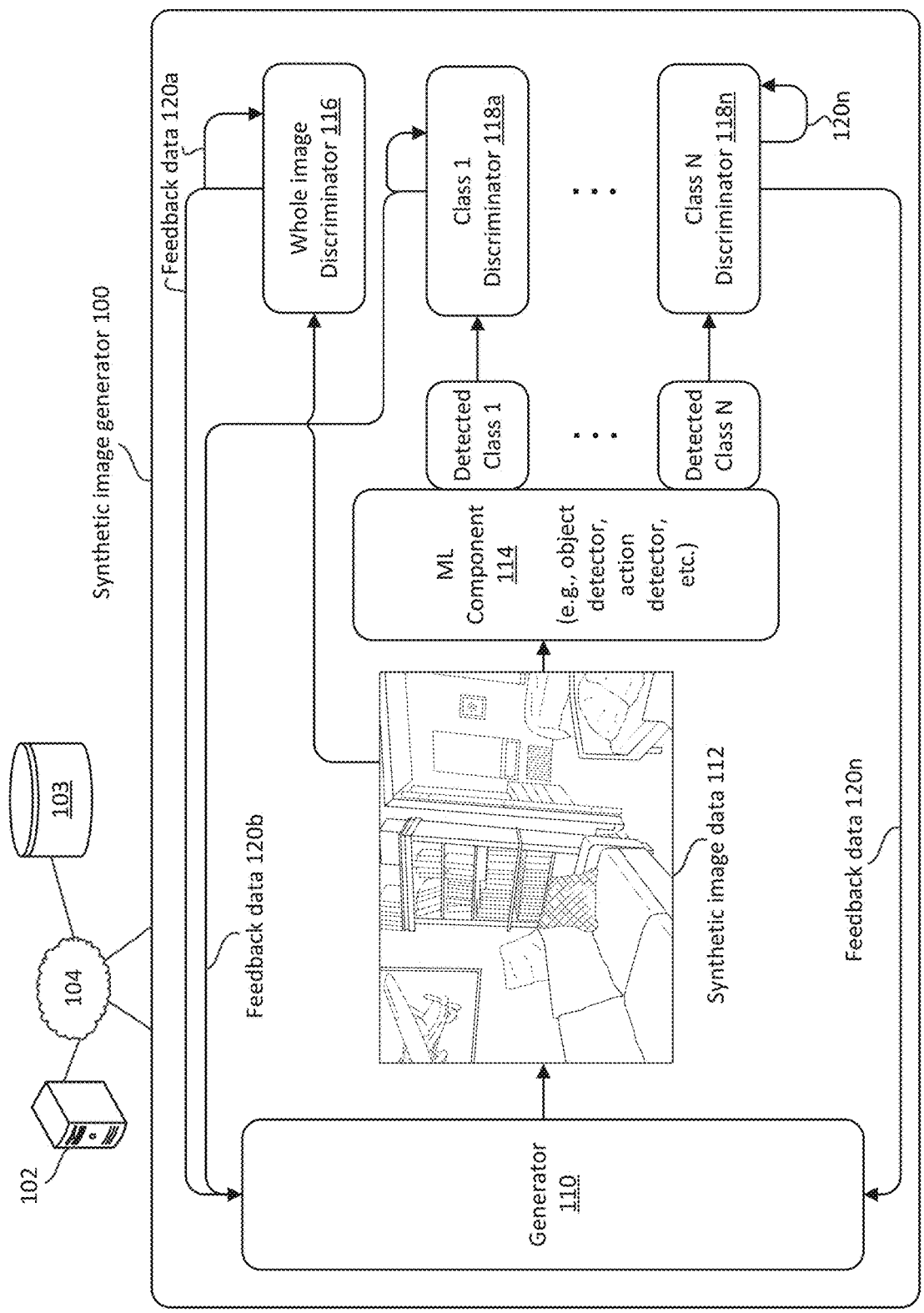
FIG. 1 is a block diagram showing an example system effective to generate synthetic image and/or video data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In many contexts, generation of high quality photographs is a time consuming and laborious process. For example, generating photographs of living rooms for an online furniture retailer may involve shipping various furniture pieces to a photography studio, arrangement in various configurations by a designer, adding different lighting effects and/or post-processing effects, etc. E-commerce services often display millions of images of products through websites and/or mobile applications to help customers find and select the items they want. In such a context, the pictures of the items themselves as well as pictures of the item in its intended environment (e.g., a sofa depicted within a furnished living room) are an important tool for item selection.

For example, when selecting a couch for purchase, a customer may want to see not only what the couch looks like by itself, but how the couch fits in a number of different room styles (e.g., contemporary, mid-century modern, glam, rustic, etc.). Users often want to see an image of the couch as well as the images of the couch in combination with multiple other living room items, such as rugs, arm chairs, coffee tables, etc. Currently, these pictures are taken in professional photo studios. As previously described, to take these images, items are typically shipped to the photo studio where an expert interior designer arranges them in a room and a professional photographer takes the pictures. This is a very slow and expensive process. For example, the shipping costs and time needed to ship a couch and large dining table alone are considerable. This cost is multiplied many times when there are many different types of items to be photographed. Because of this, the number of products photographs may be limited and/or the photographs may be limited to a single room and/or style with a small number of other products.

Described herein are systems that can generate millions of synthetic images and/or videos of any desired scene. For example, in the home furnishings context described above, rooms with one or multiple products, such as couches, chairs, tables, rugs, and lamps may be generated in a multitude of different styles, arrangements, and/or configurations of items. Additionally, the synthetic image generation systems described herein also draws the room, including walls, windows, plants, décor, etc. The synthetic images and/or videos generated using the various techniques described herein appear realistic, even though the depicted scenes have never been arranged. That is, the rooms (or other image/video environments) do not exist, they are synthetically generated using various machine learning algorithms described herein.

A great advantage of the synthetic image generation systems and techniques described herein is the increase in image variability. Shipping products to a professional photo studio is not only slow and costly, it also limits the number of arrangements one can make. This can lead to user frustration because users may not be able to see how a product of interest appears in a room setting that more closely resembles their home or preferred room style. The various synthetic image generation techniques described herein solves these problems by generating a large number of combinations of products in an equally large number of rooms. For example, variability may be introduced by changing the room's color, the object's color, the object's material, the object's style, etc. The various techniques described herein achieve such variability without the need to ship in new products to a physical studio or find a different room in which to display the items.

In some examples, the machine learning algorithm for synthetic image generation may be divided into two components. The first component may generate two-dimensional (2D) images (and/or videos). The second component may ingest actual ("real") photos of rooms (or other types of photos depicting a physical environment) as well as the synthetically generated images and may decide whether the generated images look as photo-realistic as the actual photos. If this second component identifies the generated images as not photo-realistic, it tells the first component of the algorithm why. The first component then uses this knowledge to generate images that solve the identified problems. This process is iterated until the images generated by the first component of the algorithm appear photo-realistic to the second component.

A major difference between various synthetic image generation techniques described herein is the ability of the systems and techniques described herein to make every object (e.g., each constituent item displayed in a room or other setting) photo-realistic. This is achieved using a third machine learning component that identifies each of the objects drawn by the synthetic image generator in order to make sure that each object is, itself, photo-realistic. When such objects are determined to be non-realistic, this third machine learning component alerts the second and first component of the identified errors. The first machine learning component attempts to correct them. This process is iterated until all the objects in the image, and the overall image itself, look photo-realistic.

In various examples, deep learning techniques may be used to detect objects in image data. Convolutional neural networks (CNNs), single shot detectors (SSDs), region-convolutional neural networks (R-CNNs), Faster R-CNN, Region-based Fully Convolutional Networks (R-FCNs) and other machine learning models may be trained to perform object detection and classification. Training an SSD, or other machine learning models, typically requires annotated training data (e.g., annotated frames of image data). Annotated training data comprises labeled image data including data representing bounding boxes that identify the location of objects represented in the image data and classification data identifying a class of the object (e.g., data representing "cat", "dog", "human", etc.). As used herein, a location of an object in a frame of image data refers to a region within the frame in which the object is represented. Locations may be represented by bounding boxes surrounding the locations of objects. Image data (e.g., frames of image data) and/or feature data extracted from image data may be annotated or unannotated.

In various examples, datasets comprising annotated training data (e.g., labeled image data) exist and may be used to train various computer vision models, such as the object detection models described above. For example, an image depicting a cat and a dog may have a bounding box drawn around the cat that may be labeled as "cat" and a separate (potentially overlapping) bounding box drawn around the dog that is labeled as "dog." Object detectors may learn to detect and classify various different classes of objects present in such training images by learning features that correspond to the different classes.

In various examples, generative adversarial networks (GANs) and related techniques like Normalizing Flows and Variational Auto-Encoders (VAEs) may be trained using the various techniques to generate synthetic image data and/or video data. Generally, in GANs, a generator (e.g., a generator network) is trained to generate synthetic image data based on input image data. The generator is trained to map data from a latent space to a particular data distribution of interest (e.g., a distribution of image data learned from the training dataset). Generally, in a GAN, a discriminator is used to discriminate between images from the true distribution (e.g., from real image data captured using a camera) and synthetic image data produced by the generator. The training goal of the generator is to increase the error rate of the discriminator (e.g., to generate synthetic image data that appears to be of the true distribution). Back propagation is used in both the generator and the discriminator networks so that the quality of synthetic image data produced by the generator is increased while the discriminator network becomes better at distinguishing between true data and synthetic data produced by the generator. In various examples, generators may be implemented using a deconvolutional neural network and discriminators may be implemented as a CNN.

As described herein, synthetic data may refer to data generated by a generator of a GAN according to a learned distribution. For example, a generator may be trained to generate images of living rooms, bathrooms, human faces, dogs, weddings, etc. Conversely, "real" image data may be image data captured by a camera from the natural world (e.g., a photograph of a living room, human, etc.).

Machine learning techniques, such as those described herein, are often used to form predictions, solve problems, recognize objects in image data for classification, etc. For example, herein machine learning techniques may be used to generate synthetic, photorealistic image data and/or video data. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram showing an example synthetic image generator 100 effective to generate synthetic image and/or video data, arranged in accordance with various aspects of the present disclosure. In various examples, synthetic image generator 100 may be implemented by one or more computing devices 102 that may be configured in communication over a network 104. Network 104 may be a communication network such as a local area network (LAN), a wide area network (such as the Internet), or some combination thereof. The one or more computing devices 102 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement one or more of the various machine learning models described herein.

Synthetic image generator 100 may comprise a generator 110 (e.g., a generator network trained as part of a GAN). The generator 110 may be trained using image data of any desired distribution. In the example depicted in FIG. 1, the generator 110 has been trained to generate synthetic image data 112 representing living rooms. However, in other example embodiments, the generator 110 may generate any type of image data of any desired distribution. For example, the generator 110 may generate images of objects disposed alone or together with other objects in an environment of interest. As used herein, such objects may include people, animals, and/or things. In some other examples, the generator 110 may be used to generate abstract images that conform to the distribution learned from the training images. In general, the generator 110 may be effective to generate images of any desired subject matter depending only on the training images supplied to the generator 110. For ease of illustration, living rooms may be used herein as an example of a type of synthetic image data that may be generated by the generator 110 of synthetic image generator 100.

Additionally, the generator 110 may comprise a machine learning architecture that may be used to condition generation of an image on one or more previously-generated images in order to generate natural-looking video data. For example, a current frame of synthetic image data being generated by the generator 110 may be constrained based on a previous frame of image data generated by the generator 110 so that movement of a moving object (e.g., a person walking) may appear natural between the previously-generated frame of image data and the current frame of image data. Accordingly, although many of the examples discussed herein describe the synthetic generation of images, the techniques and systems described herein may be used to generate synthetic video data, as well.

The synthetic image data 112 generated by generator 110 may be sent as an input to an machine learning component 114 (e.g., an object detector, an action detector in the case of video, a natural language processing model, a semantic segmentation model, etc.). The nature of the machine learning component 114 may vary depending on the particular implementation. For example, in some examples described herein, the machine learning component 112 may be an object detector that may be trained to identify different objects in the image. In some examples, the machine learning component 114 may include a natural language processing model trained to detect text (e.g., written words) depicted in the synthetic image data 112. In some further examples, the machine learning component 114 may include a semantic segmentation model trained to identify different objects and/or portions of the synthetic image data 112 that correspond to different objects and/or surfaces and which may generate a segmentation mask that distinguishes from among the different types of objects/surfaces. In some further examples, the machine learning component 114 may comprise a combination of the aforementioned components (e.g., an object detector and a natural language processing component). In general, the machine learning component 114 may be effective to identify different portions of the synthetic image generated by the generator 110 that correspond to different classes of image data. As described in further detail below, there may be class-specific discriminators 118a, . . . , 118n that may be effective to receive those portions of the image data that correspond to the relevant class of the discriminator.

Generally, the machine learning component 114 may detect different portions (e.g., different groupings of pixels) of the image data generated by the generator 110 that correspond to different, distinguishable elements (or classes) represented in the image. A class may be any representative group of objects, surfaces, persons, text, animals, shadows, colors, actions, quantitative and/or qualitative values representing portions of the image, semantic values/concepts representing portions of the image, etc. Further, in the case where generator 110 generates video a class could correspond to sound (e.g., music) and the machine learning component 114 may detect different types of music and/or sound present in the video.

In one example implementation, the machine learning component machine learning component 114 may be an object detector trained to detect objects of various different classes (e.g., chairs, dogs, framed artwork, water, etc.). In various examples, the machine learning component 114 may output data that identifies a portion of the synthetic image data 112 that corresponds to an identified object along with classification data classifying the particular object. For example, the machine learning component 114 may output a bounding box surrounding an arm chair identified within the synthetic image data 112 and a label that classifies the image data in the bounding box to the class "arm chair."

Again, the particular classes detected by machine learning component 114 depends on the type of model(s) used and on the annotated training data used to train the machine learning component 114. In the living room example depicted in FIG. 1, the machine learning component 114 may be effective to detect objects that typically appear in a living room (e.g., sofas, arm chairs, coffee tables, rugs, lamps, etc.). In some examples, a sharp, pixel-wise contour may be used to crop different classes of image data (e.g., different detected objects from the entire image. This may be performed for both synthetic image data 112 as well as training data comprising real images. In other words, pixels and/or bounding boxes determined to correspond to an identified objects may be identified and/or generated separate from the ensemble image. In addition to use of bounding boxes and/or such cropping techniques, segmentation techniques may be used to crop image data corresponding to particular objects from the synthetic image data 112.

The portions of image data corresponding to each identified class may be sent to a class-specific discriminator. For example, machine learning component 114 may detect two chairs within synthetic image data 112. The machine learning component 114 may send the cropped images of the chairs (e.g., pixel-wise segmentation masks and/or bounding boxes of the pixels representing the two chairs) to a discriminator network that is specific to the class "chairs." Similarly, image data representing detected sofas may be sent to a discriminator network that is specific to the class "sofa." In some other examples, there may be a particular discriminator network that is specific to the class "music," another discriminator network that is specific to the class "text," etc.

This is represented in FIG. 1 as object classes 1 . . . N output by machine learning component 114 being sent to different classes of discriminators, including class 1 discriminator 118a, . . . , class N discriminator 118n. Synthetic image generator 100 may include logic to determine the classes output by the machine learning component 114 and to send the cropped image of those portions of the synthetic image to the corresponding class-specific discriminator 118a, . . . , 118n.

Each of the class-specific discriminators 118a, . . . , 118n may receive cropped image data (and/or snippets of audio data and/or groupings of frames of image data in the case of video) of the appropriate class and may generate label data indicating a prediction of whether the cropped image is "real" (e.g., is a photograph of the relevant object) or is "synthetic" (e.g., was generated by the generator). Such label data may be fed back to the generator 110. In addition, when the discriminators 118a, ..., 118n determine that input cropped image data is synthetic, the discriminator may send adversarial loss data indicating the reasons why the discriminator was able to identify the cropped image data as synthetic to generator 110. The label data and the adversarial loss data may be described generally as "feedback data." In FIG. 1, each of the class-specific discriminators 118a, ..., 118n may output respective feedback data 120b, ..., 120n (or, more generally, feedback data 120).

Generator 110 may, in turn, use the adversarial loss data (e.g., feedback data 120) and/or other loss functions to update parameters of the generator 110 in order to minimize the adversarial loss. Accordingly, over several iterations, the generator 110 is able to improve the image quality of the individual synthetic objects (or other non-object portions of the image) drawn by the generator to be more and more natural looking (e.g., photorealistic). In addition to such a per-object class GAN architecture, the ensemble synthetic image data 112 (e.g., the "whole" image) is sent to a whole image discriminator 116. The whole image discriminator 116 likewise generates real or synthetic label data and adversarial loss data for the ensemble synthetic image data 112. The whole image discriminator 116 helps to ensure that, even when individual portions of the image appear photorealistic, that the arrangement of such image portions in the scene also appears natural. Accordingly, in FIG. 1, whole image discriminator 116 sends feedback data 120a to generator 110. As described in further detail below, the various feedback data generated by the discriminators may be used to update parameters of the respective discriminator networks to improve the ability of the discriminator networks to distinguish between real image data and synthetic image data.

The loss function used to update generator 110 may include a regularizer to penalize generation of images by generator 110 that appear similar to one another. Accordingly, the regularizer term of the loss function may introduce variability into the sets of images generated by the generator 110. The regularizer may include a tunable parameter to control the amount of variability from image-to-image. Accordingly, in various examples, the generator 110 may be used to generate a variety of different images related to a particular class of object or a particular class of image (e.g., a variety of living room images or a variety of scenes depicting a playground, a variety of artwork images, etc.). In some examples, the variety of images may be used by designers (e.g., product designers, artists, etc.) as inspiration to create actual objects, artwork, inspired by the variable images created by the generator 110.

A standard generative adversarial network comprises of a generator (G) and a discriminator (D). The generator aims to map a prior latent distribution (z~p(z)) to a source distribution (x~p(x)). The discriminator helps by capturing the distinguishing factors between the training and the generated samples. Mathematically, both the generator and discriminator are optimized for the following competing objective function in an alternating and iterative setup:

$$E_{x \sim p(x)}[\log D(x)] + E_{z \sim p(z)}[\log(1 - D(G(z)))] \quad (1)$$

where G(.) is the generator function, D(.) the discriminator function (e.g., a neural network), $E_{p(.)}(x)$ is the expected value of a random variable x given by the density model p(.). A standard discriminator is a classification network which predicts whether the image is real or synthetic.

To explicitly capture the finer details of each object in the image, the standard discriminator (defined in Equation (1) above) is augmented in the various techniques described herein with additional object category-specific discriminators. This helps by providing object specific feedback to the generator thereby improving local quality.

To this end, as an example, an object detector (O) is employed to detect bounding boxes of objects in one of the L classes of interest. Both the generated synthetic images and the real images are passed to the object detector to obtain crops of the objects. The obtained crops of an object category are reshaped to a common size (e.g., 128×128) and passed to a discriminator algorithm specific to that category (e.g., $D_0(.), D_1(.), D_2(.), \ldots D_L(.)$), where $D_0(.)$ is a global discriminator, and $D_1(.)$ to $D_L(.)$ are the class-specific discriminators).

A variety of optimization strategies are possible to tune G, $D_{0:L}$. A naïve approach would be to combine $D_{0:L}$ at the feature vector level and treat it as a single discriminator architecture and optimize it in the standard GAN setting according to Equation (1). To handle scenarios where an object category may not be present in the generated image, a zero vector may be used in-place of the feature vector of that specific $D_i$.

An alternative optimization strategy is to treat this as a multiplayer game. For example, for a pixel p of the generated image belonging to object bounding boxes $B_i$ the feedback comes from multiple $D_i$'s and for all other pixels from the global discriminator $D_0$. Mathematically, the loss term for the generator becomes the following:

$$L_G = (1 - \Sigma_{i=1}^N \lambda_i) \log(D_0(G(z))) + \Sigma_{i=1}^N \lambda_i \log(D_i(O(G(z)))) \quad (2)$$

where $\lambda_i$ is the weight scaling parameter for each object category discriminator ($D_i$).

The techniques described above add multiple global and fine-grained categorical discriminators, each covering specific properties. Each of these discriminators can be combined at the feature vector level, or can be optimized as a multiplayer game. In addition to the global and fine-grained discriminators described above, additional discriminators and/or regularizers may be added to account for a number of image and/or implementation requirements.

2D images correspond to a projective projection of 3D scenes. The properties of a projective projection are well known and thus easy to add as additional constraints. Projective projection constraints can be added as a discriminator with a task of determining how accurate the 2D representation is, and/or as regularizers to enforce perspective effects. For example, parallel lines in 3D are projected onto 2D converging lines. These lines converge onto vanishing points and vanishing points of parallel lines on the same 3D plane are on the same line at infinity (commonly known as the horizon).

Another property of 2D images is the existence of sharp edges between objects. For example, the constraint that the wireframes of the images are straight lines may be imposed. This is a perspective effect and typical of many furniture items in indoor scenes. A statistical comparison between photos and synthetic images forces the generator to draw more realistic images. Potentially, after detecting the straight lines, a perspective regularizer can be added to the generator loss function.

The global structure as well as the details of an image are given by its high and low spatial frequencies, respectively. For an image to appear real to an observer, these spatial frequencies should be consistent with those seen in photos. Accordingly, a discriminator and/or a regularizer based on the discrete Fourier transform or any other spectral transforms like discrete cosine transform, scattering transform of an image may be used. However, other image decomposition methods are equally valid and may be used in accordance with the various techniques described herein.

Additionally, bandpass filtered images can be provided as an input to a discriminator (instead of the 3 channel RGB input, 3 channel (RGB)+n bandpass filtered images are provided as input to D). The Fourier domain may also be used to control the smoothness of the image. This is done in two ways. First, it may be a goal to impose consistency across the entire image. This can be achieved, for example, by emphasizing similar low- and mid-frequencies on the entire image. Second, high-spatial frequencies may be imposed on individual objects in the image, as objects have a number of details and edges that require high-spatial frequencies. A Discrete Cosine Transform (DCT) decomposition may also be used to select the appropriate frequencies.

In addition, a diversity regularizer may be added. This regularizer enforces generated synthetic images to be as different from one another as possible. One problem with the generation of complex scenes (e.g., living rooms, patios, etc.) is that an algorithm may learn to generate a few photo-realistic images but fail to generalize it beyond this limited set of images. The various techniques described herein solve this issue by imposing large variability between generated images. For example, when generating synthetic living room images, it may be desired that some of the images have coffee tables, while others do not. Additionally, furniture should be in different locations, orientations, sizes, shapes, shadings, colors, etc. The information provided by the fine-grained discriminators may be used to measure the difference between the generated images. The diversity regularizer may maximize this difference measurement.

Semantic knowledge may also be added to the image generation process to improve photo-realism. This semantic knowledge is specific to the type of image to be generated. For example, when generating images displaying furniture, it may be a goal to add the knowledge that most furniture items are symmetric. For example, a couch is symmetric—if you divide the couch vertically by its midline to obtain a left and a right half, these two half should be mirror-symmetric. The same is true for a bed, a night stand, a sink, a mirror, a dresser, and many more items. In other applications, other semantic concepts can be imposed. For example, when generating patio images, it is known that the grass should be green. When generating mountain scenes, it is known that mountains are typically in the background at a smaller scale than the foreground objects, etc. These concepts are easily modeled mathematically and, hence, can be readily added as additional discriminators, or regularizers, to the loss function of the image generator function. For example, mirror-symmetry can be easily computed as a simple illumination-invariant pixel-to-pixel comparison for non-occluded pixels. Illumination invariance can be readily computed using the illumination cone or other computer vision algorithms The image distribution describing living rooms (or other complex images) is a complex multi-modal distribution. An unconditional GAN might miss modes that are underrepresented in the training data. To overcome this, various techniques discussed herein cluster a given training set of images into a predefined number (k) of clusters. Later a conditional GAN (by conditioning on the cluster index) is used to learn a conditional distribution covering all the 'k' modes. Formally, the training objective is the following:

$$E_{x \sim p(x)}[\log D(x|c)] + E_{z \sim p(z)}[\log(1 - D(G(z|c)))] \quad (3)$$

where c is the cluster index.

Described herein are approaches to generate a synthetic room image containing a given object, (e.g., a specific piece of furniture). In some examples, the object image may be provided in a white background image, but it can also be a crop from a scene. The various techniques described herein, may extend the previously-defined (unconditioned) GAN to be conditioned on the image of the given object. Solutions to accomplish this goal are described below.

In our first solution, two modifications are introduced to the above-defined algorithm to convert the unconditional GAN to a conditional GAN. First, an image encoder is added, that maps the input image to a feature embedding, and is later used as an additional input to the generator G. Second, an additional loss term is used in combination with the standard adversarial loss shown in Equation (1). Depending on the application, this loss term might differ. For example, if the application requires generating a lifestyle image from a white background item image, then the additional loss term could be L2 distance in RGB pixel space or a feature space between the input and output images. Another example is to generate a professionally designed room image given an unfurnished room. In this case, the loss term can be the distance of the embeddings of the room itself and compared those in the input and output images.

In various examples, the network may comprise three streams: a generation stream, a detection stream, and a feedback stream. For generation stream, given a white background item image X, an image encoder E(.) maps the image to a feature embedding of dimension p. The generator G(.) takes the concatenation of latent code z and E(X) as input and generates an output lifestyle image. During the inference stage after training, this is the only stream for image generation.

The synthesized image will be passed to a pre-trained object detector O(.) that detects the bounding boxes of the corresponding object classes/categories. The object detector may be trained simultaneously with the generator. The network is then constrained to synthesize the exact object (e.g., a sofa, etc.) in the output image as it is in the input image by minimizing a perceptual loss. For example, we can use the L2 consistency loss defined on a mini-batch of N samples as a perceptual loss. Formally, $$L_c = 1/N \Sigma_{j=1}^{N} d(X_j, O(G(E(X_j), z))) \quad (4)$$

where d(,) is the Forbenius norm. The $L_c$ will then be combined with the adversarial loss Lady defined earlier in the feedback stream by addition, namely $L_{total} = L_c + L_{adv}$ which may be optimized using gradient-based methods for the parameters of encoder E, generator G, and D. It should be appreciated that any perceptual loss functions may be used in lieu of the loss function defined above.

The second approach takes advantages of an existing unconditional GAN model and does not require additional training. Since a trained model has already estimated the underlying distribution of all scenes of interest (e.g., the underlying distribution of all living rooms), it is known that the images of a scene with the specific object desired are present in this distribution. The goal is to find the images, which can be solved using an optimization approach.

The approach is to find the latent code that most accurately reconstructs the input object while maintaining photo-realism of the entire image. For a given latent code z, a synthetic image G(z) is generated. As the goal is to generate a realistic image containing the exact object shown in the target conditional image, we use a combination of two losses $L_r$ and $L_c$ to measure overall image realism and the quality of the recovered conditional object, respectively.

To calculate the overall image realism loss $L_r$, the generated image is sent to the discriminator D that was originally trained with the generator G. The scalar output of the discriminator directly serves as a measurement of image quality. This design is sensible since D is originally trained to measure image realism in the unconditional setup as described above. More specifically, $L_r=D(G(z))$.

To measure the quality of the recovered conditional object, the L2 distance in RGB pixel space is measured between the generated image (within the detected area) and the input conditional image. Namely, $L_c=d(X,O(G(z)))$ where d(,) is the Forbenius norm and X is the input conditional image. The final latent code that produces a realistic image containing the target object is optimized with respect to the following objective $$\min_{z}(L_c + L_r)$$

This objective optimizes with respect to z, instead of the parameters of the network as usually done in network training. The generator and discriminator are both fixed in terms of their parameters. This optimization process explores the image manifold (by moving the latent code around) already learned by the generator to find the optimal latent code for minimizing the combined objective function.

Another solution to the problem is to condition the generated image of G(.) to a specific background and fore-ground object. A stacked item image is an image with a target object overlayed on a real or synthetic background. For a given white background item image $X_c$ in RGB space, a Boolean mask $M_c$ of all the pixels belonging to the object in the image, may initially be extracted:

$$M_c=(X_{c_R}<\theta)\lor(X_{cG}<\theta)\lor(X_{cB}<\theta), \quad (5)$$

where $X_{c_R}$, $X_{c_G}$, and $X_{c_B}$ denote the R, G and B channels of $X_c$, θ is a predefined threshold for white pixels, which is 240 for an 8-bit image (in the current example), and is a logic OR operation. The mask $M_c$ is true for all pixels that are not white (which we assume belong to the object).

Then for a given real or synthetic image $X_b$, a stacked item image $X_s$ can be generated as $$X_s=M_c*X_c+(1-\hat{M}_c)*X_b, \quad (6)$$

where the $\hat{M}_c$ is the float version of the Boolean mask.

Figure 2:
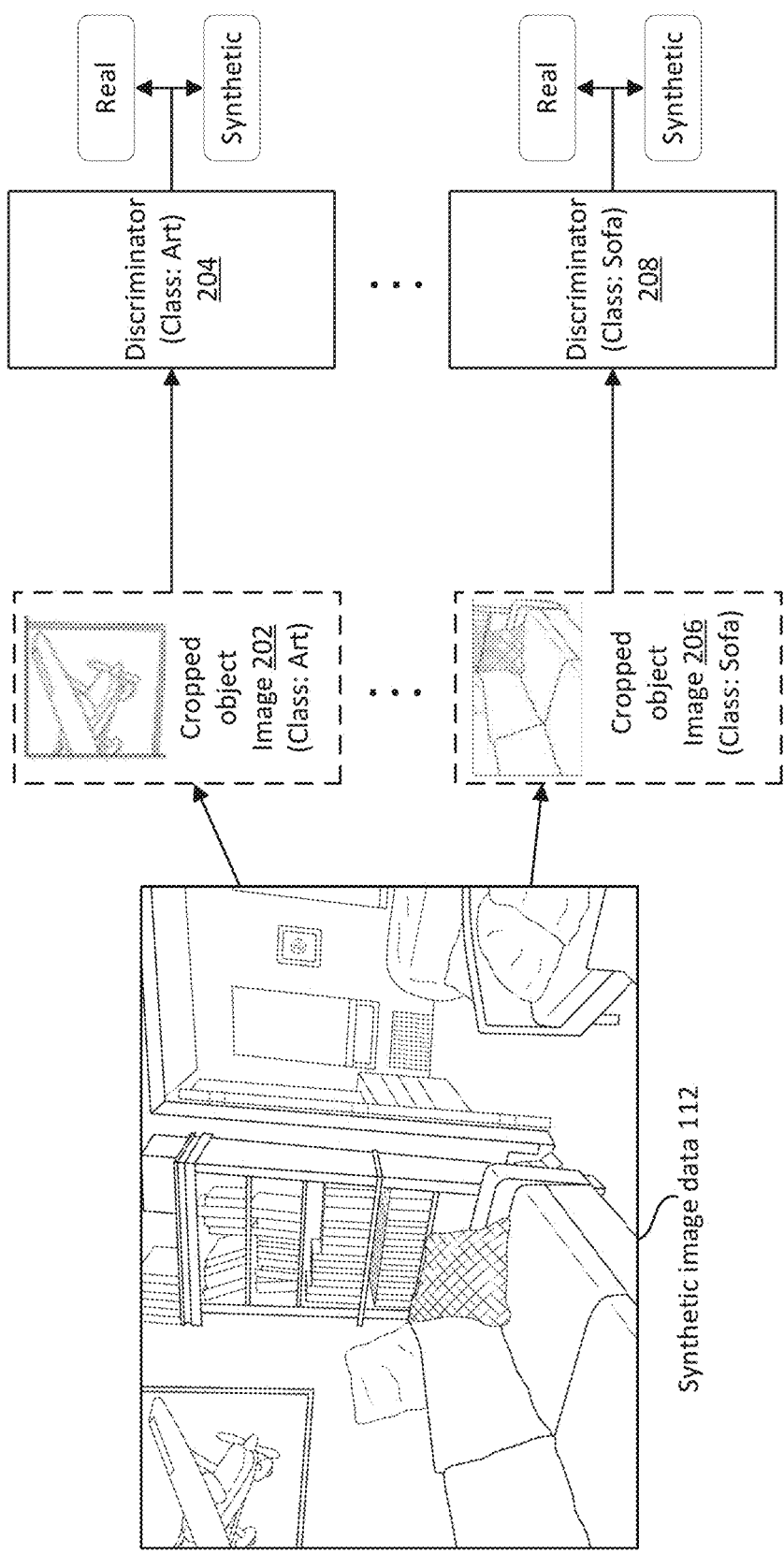
FIG. 2 is a diagram depicting sending portions of synthetic image data to per-class discriminator networks, in accordance with various aspects of the present disclosure.

FIG. 2 is a diagram depicting sending portions of synthetic image data to per-class discriminator networks, in accordance with various aspects of the present disclosure. In the example depicted in FIG. 2, synthetic image data 112 depicts an image of a living room including framed art showing an airplane, a sofa, a bookcase with books, an arm chair with throw pillows, etc.

As previously described above, in some examples, machine learning component 114 may be an object detector trained to detect one or more objects in the synthetic image data 112 drawn by the generator 110. In the example depicted in FIG. 2, the machine learning component 114 detected the art and the sofa (potentially among other objects detected by the machine learning component 114). Cropped object image 202 represents a cropped portion of synthetic image data 112 that includes the pixels determined by the machine learning component 114 to represent the art object. Accordingly, cropped object image 202 is labeled as pertaining to the class: art.

Similarly, cropped object image 206 represents a cropped portion of synthetic image data 112 that includes the pixels determined by the machine learning component 114 to represent the sofa. Accordingly, cropped object image 206 is labeled as pertaining to the class: sofa.

After generating the cropped images for each detected object, the synthetic image generator 100 may be effective to determine the appropriate class-specific discriminator networks to which to send each of the cropped images. In the example of FIG. 2, cropped object image 202 is sent to the discriminator 204 since both cropped object image 202 and the discriminator 204 are specific to the object class: art. Similarly, cropped object image 206 is sent to the discriminator 208 since both cropped object image 206 and the discriminator 208 are specific to the object class: sofa. Additionally, although not shown in FIG. 2, the entire synthetic image represented by synthetic image data 112 may be sent to whole image discriminator 116.

Each of the discriminators 204, 208, etc., may predict whether the cropped image data sent to that discriminator is real or synthetic. Additionally, in the event that the discriminator identifies a cropped image as being synthetic, the discriminator may send adversarial loss data indicating the reason why the discriminator was able to identify the cropped object image as synthetic to the generator 110.

For example, the discriminator 204 may generate a prediction as to whether the cropped object image 202 is real (e.g., a photograph of artwork) or synthetic (e.g., synthetic artwork generated by generator 110). If the discriminator 204 identifies that the cropped object image 202 is synthetic, the discriminator 204 may send adversarial loss data to generator 110. The generator 110 may update parameters of the generator network to minimize the adversarial loss (using back propagation).

Similarly, the discriminator 208 may generate a prediction as to whether the cropped object image 206 is real (e.g., a photograph of a sofa) or synthetic (e.g., a synthetic sofa image generated by generator 110). If the discriminator 208 identifies that the cropped object image 206 is synthetic, the discriminator 208 may send adversarial loss data to generator 110. The generator 110 may update parameters of the generator network to minimize the adversarial loss (using back propagation). This process may be carried out for each of the class-specific discriminators for each class of object detected in a particular input synthetic image data 112. Additionally, the ensemble synthetic image may be sent to a whole image discriminator 116.

Figure 3:
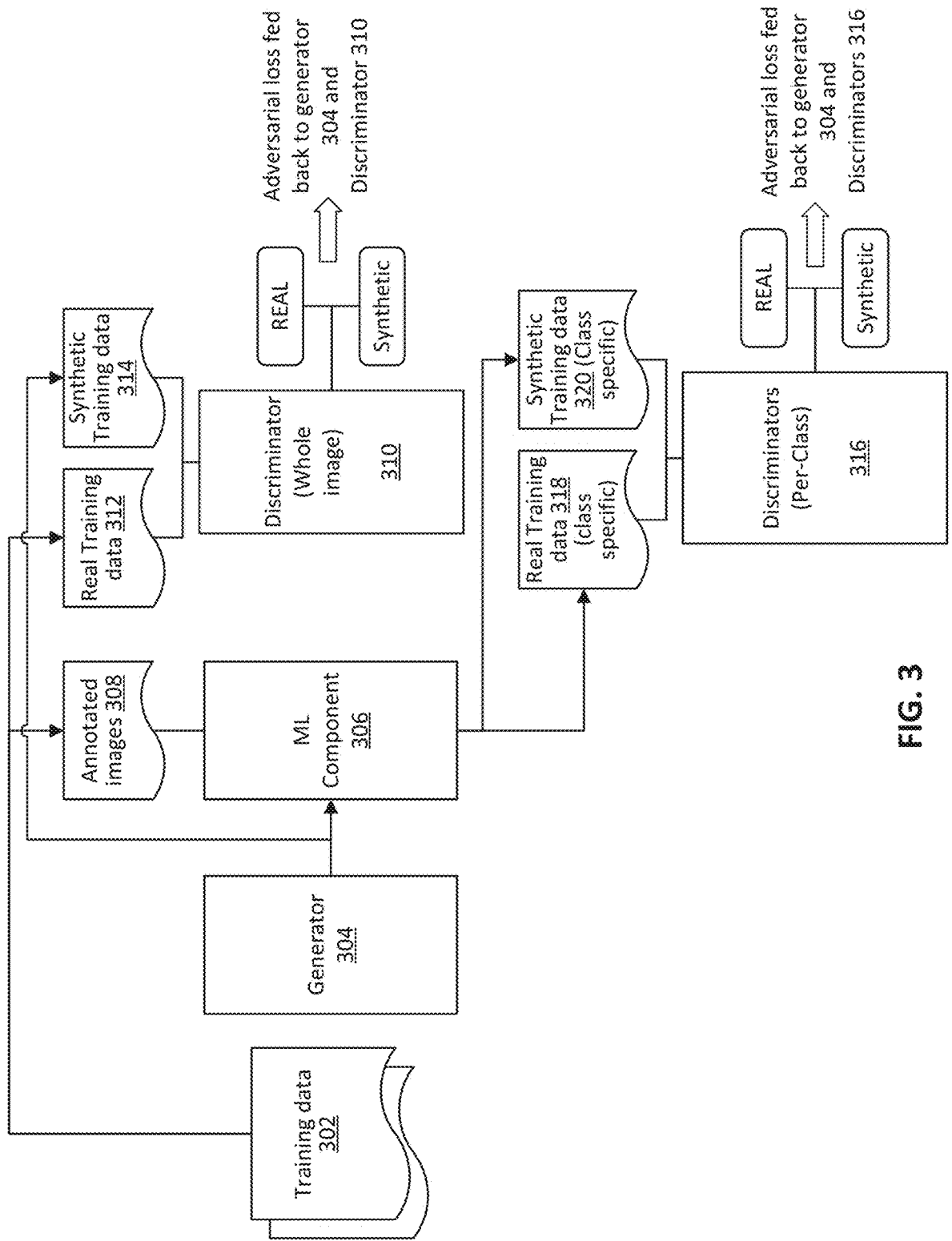
FIG. 3 is a block diagram depicting training of a generative adversarial network including an object detector and per-class discriminators, in accordance with various aspects of the present disclosure.

FIG. 3 is a block diagram depicting training of a generative adversarial network including an object detector and per-class discriminators, in accordance with various aspects of the present disclosure. Training data 302 may comprise curated images of a particular type for which the discriminators 310, 316 are to be trained. Accordingly, the training data 302 may be sent to discriminator 310 as real training data 312. As described in further detail below, the training data 302 may also be sent to machine learning component 306 (e.g., an object detector). The machine learning component 306 may detect different classes represented by portions of the images of training data 302 and may send cropped versions of such portions to the appropriate per-class discriminators 316 (e.g., as real training data 318).

In an example, if generator 304 is to learn to generate images of bathrooms, the training data 302 may comprise a plurality (e.g., hundreds or thousands) of images of bathrooms. Accordingly, the discriminators 310, 316 may send feedback data to the generator 304 that the generator 304 may use to update parameters such that the generator is better able to generate synthetic image data that conforms to the target distribution of the training data 302. Generator 304 may be a deconvolutional neural network effective to generate synthetic image data conforming to the distribution learned from the training data 302.

The synthetic image data output of the generator 304 may be sent to the machine learning component 306. Machine learning component 306 may be, for example, an SSD, a CNN, an R-CNN, etc. In examples where the machine learning component 306 is an object detector, the machine learning component 306 may be trained using annotated images 308 to identify various objects. The annotated images 308 may include a variety of images with labels classifying various objects within the images. For example, pixel-wise and/or bounding box level annotation may be used to provide ground truth label data in the annotated images 308. Although machine learning component 306 may take many different forms (as previously described), machine learning component 306 is described as being an object detector in reference to FIG. 3, for illustrative purposes.

Cropped images of objects detected by the machine learning component 306 (from synthetic image data output by generator 304) may be sent to the appropriate per-class discriminators 316. The per-class discriminators 316 may be trained using training data comprising a mixture of real training data 318 and synthetic training data 320. Real training data 318 may be photographs of real objects (e.g., real images of training data 302 that have been separated into per-class crops by machine learning component 306), while synthetic training data 320 may be images of objects synthetically generated by a generator network (also separated into per-class crops by machine learning component 306).

For example, for a discriminator 316 that is specific to the object class "sofas," the real training data 318 may comprise images of different sofas that have been cropped from the real images of training data 302, while the synthetic training data 320 may comprise synthetically-generated images of sofas. As previously described, the adversarial loss from the per-class discriminators 316 may be fed back to generator 304 and may be used to update parameters (e.g., weights) of the generator 304 to improve the quality of the different objects drawn by the generator 304. Additionally, the loss may be used to update parameters of discriminators 316.

The ensemble image data output by generator 304 may be sent to discriminator 310 (e.g., a whole-image discriminator). Discriminator 310 may be trained using training data comprising a mixture of real training data 312 (e.g., from training data 302) and synthetic training data 314 (e.g., the output of generator 304). Real training data 312 may be photographs of real scenes (e.g., photographs of bathrooms), while synthetic training data 320 may be synthetically-generated scenes of bathrooms (e.g., by a generator network). As previously described, the adversarial loss from the discriminator 310 may be fed back to generator 304 and discriminator 310 and may be used to update parameters (e.g., weights) of the generator 304 and discriminator 310 to improve the quality of the scenes (potentially comprising an ensemble of objects) drawn by the generator 304 and improve the ability of discriminator 310 to distinguish between real images and synthetic images.

In some examples, the generator 304 may be trained to generate different types of images based on different sets of training data 302. For example, generator 304 may be trained to generate living room images using a first set of training data 302 and trained to generate kitchen images using a second set of training data 302. In such examples, a user of the generator 304 may select the type of synthetic image data to be generated using a particular input. For example, an input parameter of "1" may cause the generator 304 to generate living room images while an input parameter of "2" may cause the generator 304 to generate bedroom images, etc.

Figure 4:
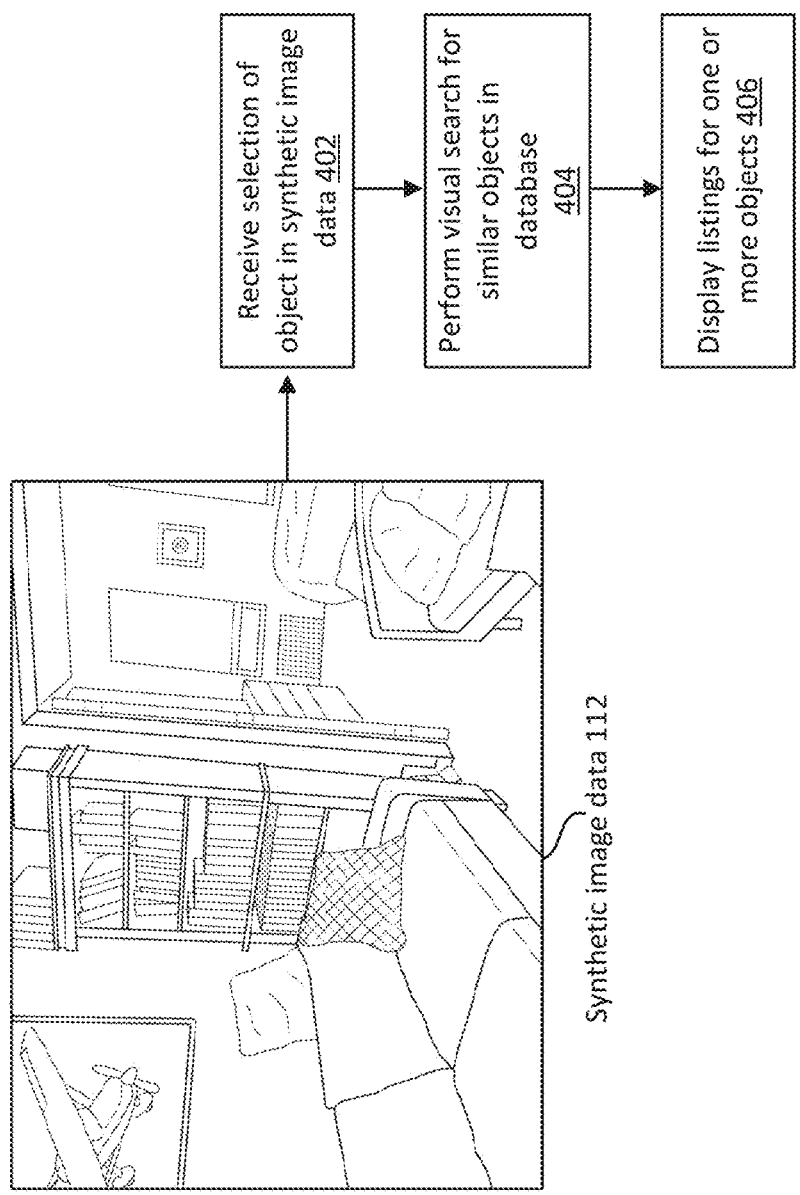
FIG. 4 depicts an example process for performing a visual search based on items selected in synthetic image data, in accordance with various aspects of the present disclosure.

FIG. 4 depicts an example process for performing a visual search based on items selected in synthetic image data, in accordance with various aspects of the present disclosure. In various examples, synthetic image data may be displayed to illustrate a particular type of scene to a user. For example, the training data used to train a generator network may comprise photographs of living rooms including items for sale via an e-commerce service. The generator may thereafter generate synthetic images of living rooms conforming to the distribution of image data learned from the training data set. However, the synthetic image data may no longer depict any images of "real" items, in the sense that the items depicted in the living rooms drawn by the trained generator do not exist in reality.

However, such images may be used to portray a variety of different styles of living rooms and may be used to perform a visual search of similar items available in some database and/or repository. For example, the synthetic images of living rooms may be used to determine the most similar items available via an e-commerce service. In FIG. 4, a user may select an item displayed in the synthetic image data 112. Since object detection has been performed on the synthetic image data 112 (e.g., using machine learning component 114), the pixels corresponding to various classes of detected objects are known and may be made selectable via a graphical user interface.

Accordingly, at operation 402, the user may select some object displayed in the synthetic image data 112. For example, the user may click on the sofa (or may otherwise select the sofa using a touch input and/or voice input).

In response to selection of the object, a visual search for similar objects in a database (e.g., in one or more furniture databases of an e-commerce service) may be performed at action 404. For example, a vector representation of the selected object (e.g., the sofa) may be determined in response to the user selection of the object. The vector representation may be used to search a multi-dimensional vector space. Other points in the multi-dimensional vector space may correspond to items available for purchase via the e-commerce system. The closest points in the multi-dimensional vector space to the selected object (e.g., to the vector representing the selected object) may be determined. For example, cosine similarity, Euclidean distance, etc., may be used to determine a distance in the multi-dimensional feature space between the vector representing the selected object and the vectors representing other objects in the multi-dimensional feature space may be determined.

After determining the closest vectors in the multi-dimensional feature space (e.g., the k-nearest neighbors), the items corresponding to those closest vectors may be determined. These items may be the items that are visually the most similar to the selected object in the synthetic image data 112 from among the items available in the relevant database(s). Thereafter, at operation 406, item listings for the one or more visually-similar objects may be displayed. Accordingly, the user may be able to browse items that are visually similar to the selected object, even though the selected object does not exist beyond the synthetic image. Furthermore, such a visual search eliminates the need for the user to use natural language to find similar available objects. In some cases, the user may not know the proper terminology used to describe a particular object of interest and may therefore be unable to search using a natural language description of the object. In the example, depicted and described in reference to FIG. 4, a visual search may be performed without requiring any natural language based search terms.

Figure 5:
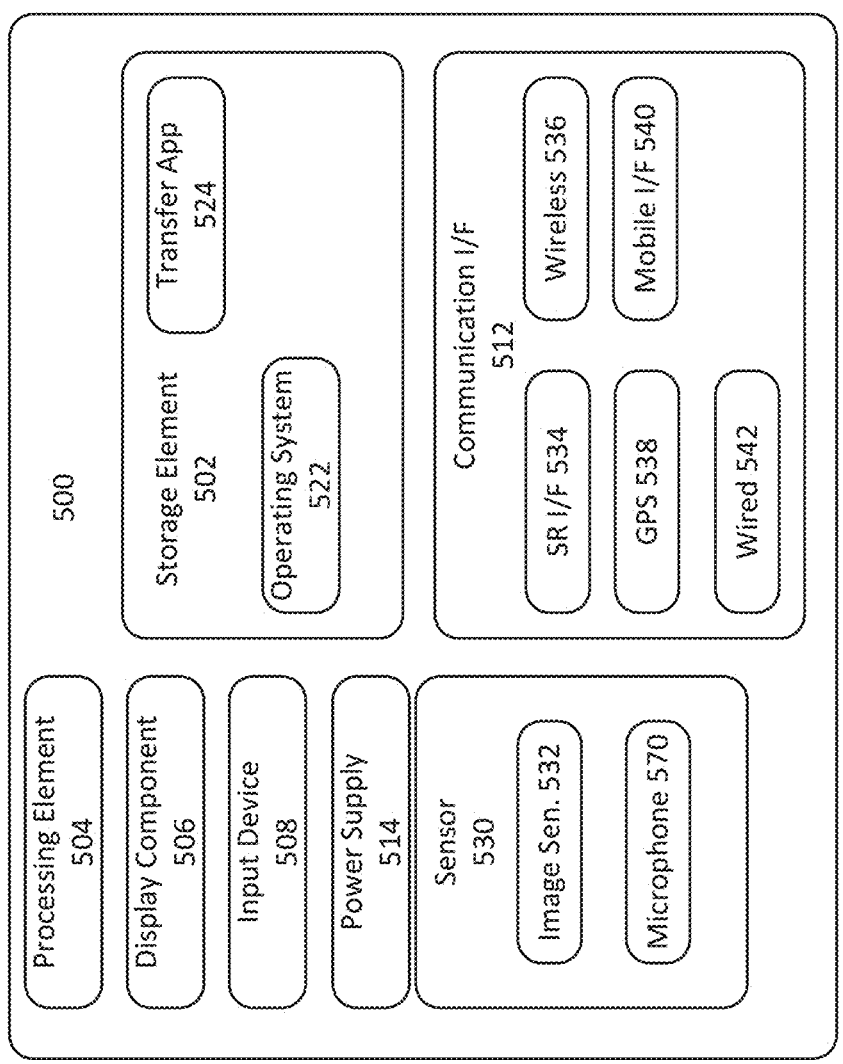
FIG. 5 is a block diagram showing an example architecture of a computing device that may be used in accordance with various aspects of the present disclosure.

FIG. 5 is a block diagram showing an example architecture 500 of a computing device that may be used to instantiate the various machine learning models and/or generate synthetic image and/or video data, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models generated using the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display suggested personalized search queries generated in accordance with the various techniques described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
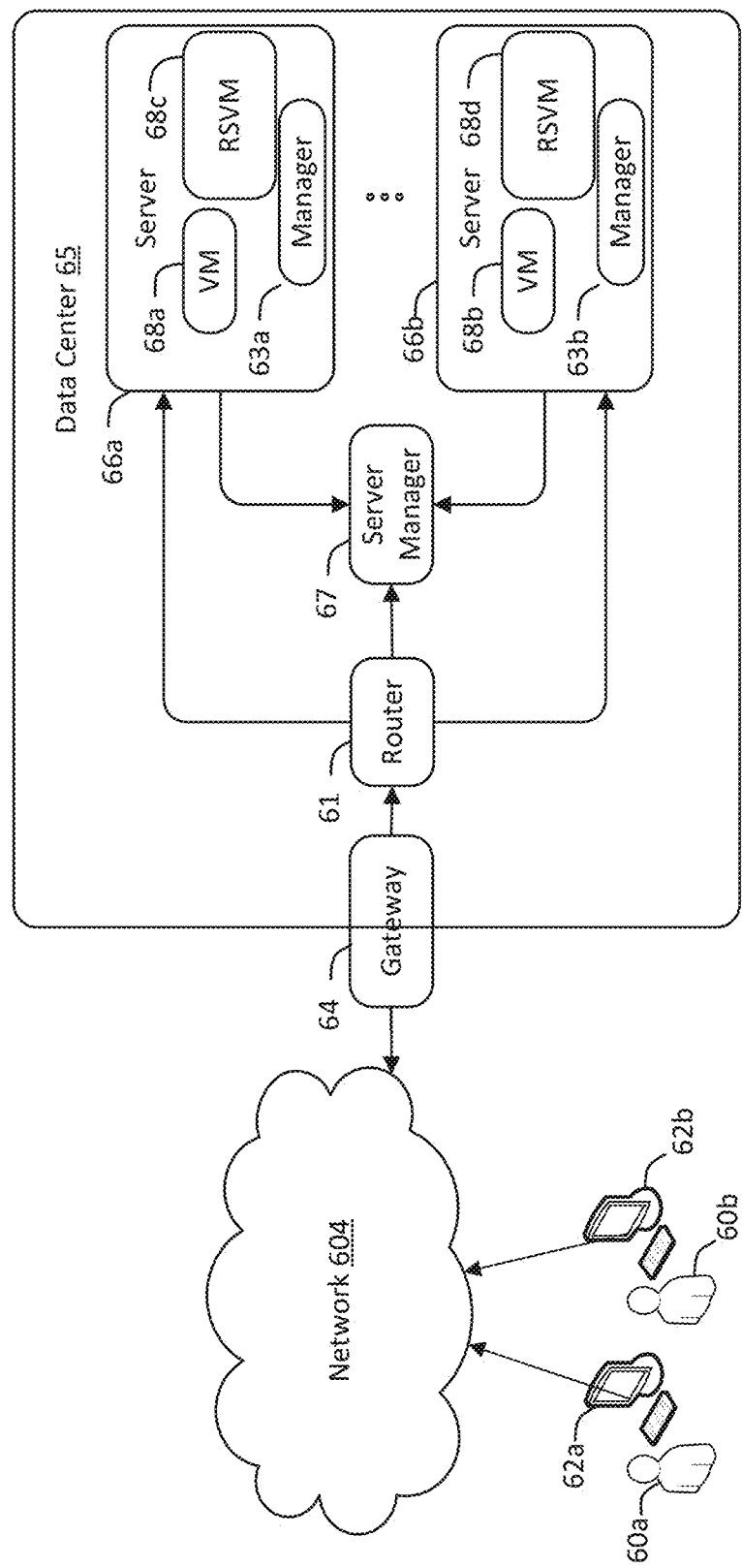
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various machine learning models described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62*a* and 62*b* (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66*a* and 66*b* (which may be referred herein singularly as server 66 or in the plural as servers 66) that provide computing resources. These resources may be available as bare metal resources or as virtual machine instances 68*a-d* (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++, and the like, or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
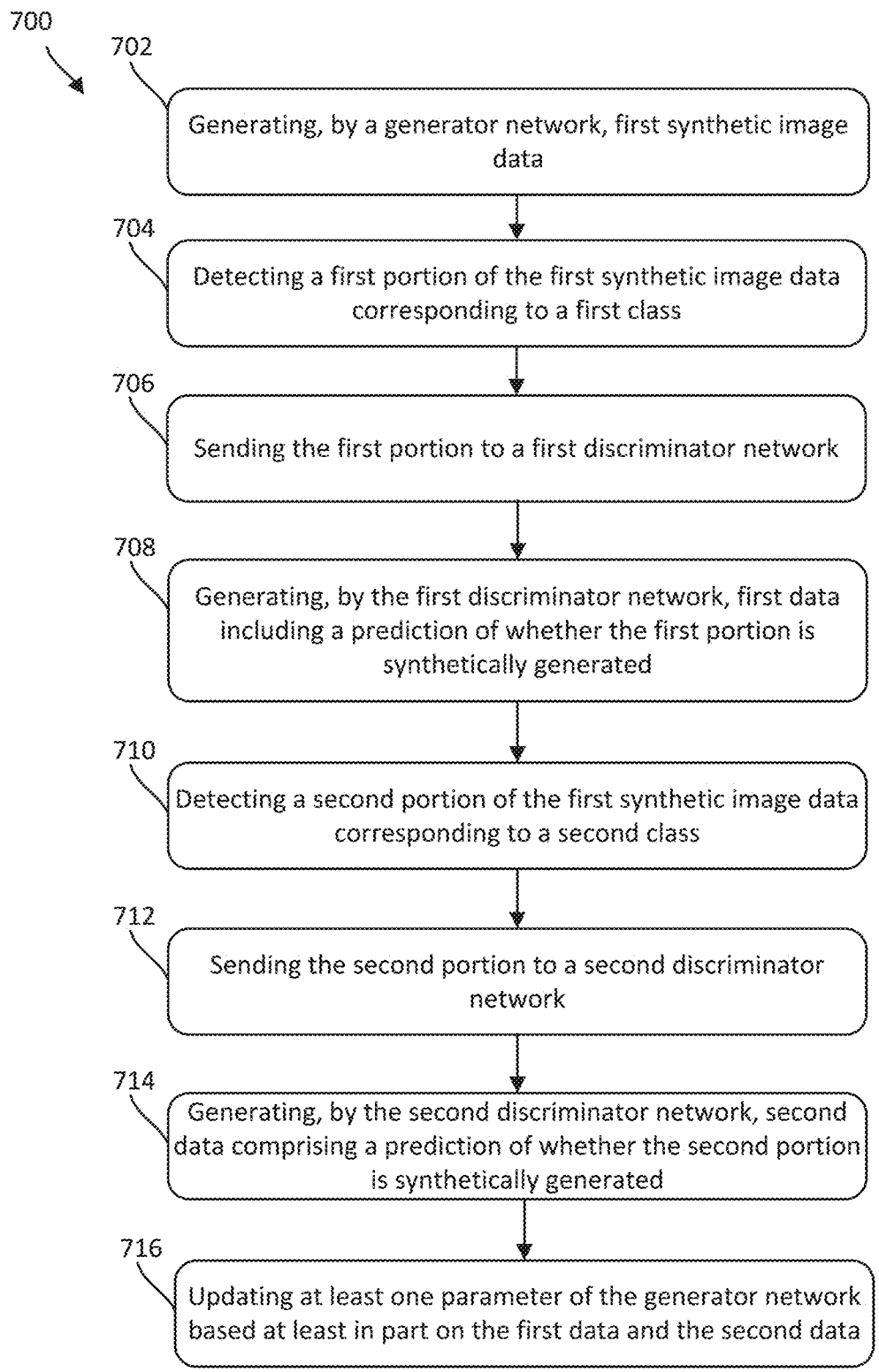
FIG. 7 flow chart depicting an example process for generating synthetic image and/or video data, in accordance with various aspects of the present disclosure.

FIG. 7 flow chart depicting an example process 700 for generating synthetic image and/or video data, in accordance with various aspects of the present disclosure. Those actions in FIG. 7 that have been previously described in reference to FIGS. 1-6 may not be described again herein for purposes of clarity and brevity. The actions of the process depicted in the flow diagram of FIG. 7 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 702, at which a generator network may generate first synthetic image data. For example, generator 110 may generate synthetic image data 112. In some other examples, the generator network may be configured to generate synthetic video data.

Process 700 may continue to action 704, at which a first portion of the first synthetic image data corresponding to a first class may be detected. For example, an object detector may be provided with the synthetic image data generated at action 702. The object detector may be trained to detect one or more classes of objects represented by the synthetic image data. The object detector (and/or some other component) may crop the portions of the image corresponding to the detected classes to generate per-class portions of the synthetic image data.

Process 700 may continue to action 706, at which the first portion may be sent to a first discriminator network. For example, upon determining that a first object of a first class is detected in the first synthetic image data, the system may determine a first discriminator network that is specific to the first class of the detected first object. The portion of the synthetic image data representing the first object (e.g., cropped image data representing the first object) may be sent to the first discriminator network.

Process 700 may continue to action 708, at which the first discriminator network predicts whether the first portion of the first synthetic image data is synthetically generated, or whether the first portion is a real image (or a part of a real image). At action 708, the first discriminator network may predict a "real" or "synthetic" label and/or adversarial loss data for the first portion of the first synthetic image data. The label and/or the adversarial loss data may be back-propagated to the generator network to update parameters of the generator network.

Process 700 may continue to action 710, at which a second portion of the first synthetic image data corresponding to a second class may be detected. For example, an object detector may be sent the synthetic image data generated at action 702. The object detector may be trained to detect one or more classes of objects represented by the synthetic image data. Accordingly, the object detector may detect the second object, which may be of a second class of object. The object detector (and/or some other component) may crop the portions of the image corresponding to the detected classes to generate per-class portions of the synthetic image data.

Process 700 may continue to action 712, at which the second portion may be sent to a second discriminator network. For example, upon determining a second object of a second class that is detected in the first synthetic image data, the system may determine a second discriminator network that is specific to the second class of the detected second object. The portion of the synthetic image data representing the second object (e.g., cropped image data representing the second object) may be sent to the second discriminator network.

Processing may continue to action 714, at which the second discriminator network predicts whether the second portion of the first synthetic image data is synthetically generated, or whether the second portion is a real image (or a part of a real image). At action 714, the second discriminator network may predict a "real" or "synthetic" label and/or adversarial loss data for the second portion of the first synthetic image data. The label and/or the adversarial loss data may be back-propagated to the generator network to update parameters of the generator network.

Processing may continue to action 716, at which at least one parameter of the generator network may be updated based at least in part on the first data and the second data. At action 716, the generator may be retrained based on the adversarial loss data generated by the class-specific discriminators. Accordingly, the generator may be improved and may be able to generate more natural looking images.

Although various systems described herein may be embodied in software or code executed by general purpose hardware as discussed above, as an alternate the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating synthetic images, comprising:
   generating, by a generator network, first synthetic image data;
   detecting a first class of image data represented by a first portion of the first synthetic image data;
   sending the first portion of the first synthetic image data to a first discriminator network, wherein the first discriminator network is associated with the first class of image data;
   generating, by the first discriminator network, first data comprising a first prediction of whether the first portion of the first synthetic image data is synthetically generated;
   detecting a second class of image data represented by a second portion of the first synthetic image data;
   sending the second portion of the first synthetic image data to a second discriminator network, wherein the second discriminator network is associated with the second class of image data;
   generating, by the second discriminator network, second data comprising a second prediction of whether the second portion of the first synthetic image data is synthetically generated;
   updating at least one parameter of the generator network based at least in part on the first data and the second data; and
   generating, by the generator network, second synthetic image data.

2. The method of claim 1, further comprising:
   sending the first synthetic image data to a first machine learning algorithm;
   detecting, by the first machine learning algorithm, the first class of image data represented by the first portion of the first synthetic image data;
   detecting, by the first machine learning algorithm, the second class of image data represented by the second portion of the first synthetic image data;
   generating first cropped image data comprising the first portion; and
   generating second cropped image data comprising the second portion.

3. The method of claim 1, further comprising:
   determining that the first discriminator network corresponds to the first class of a first object, wherein the first portion of the first synthetic image data is sent to the first discriminator network based on the determination that the first discriminator network corresponds to the first class of the first object; and
   determining that the second discriminator network corresponds to the second class of a second object, wherein the second portion of the first synthetic image data is sent to the second discriminator network based on the determination that the second discriminator network corresponds to the second class of the second object.

4. The method of claim 1, further comprising sending the first synthetic image data to a third discriminator network, wherein the third discriminator network is trained to predict whether image data representing an ensemble of objects is a real image or a synthetically-generated image.

5. The method of claim 1, further comprising:
   generating a first vector representation of the first portion;

determining a second vector representation in a multi-dimensional vector space based on a distance between the first vector representation and the second vector representation, wherein the second vector representation corresponds to an item available for purchase via an e-commerce service; and displaying a listing for the item on a display.

6. The method of claim 1, further comprising generating, by the generator network, the second synthetic image data, wherein the first synthetic image data and the second synthetic image data are respective frames of a video.

7. The method of claim 6, further comprising determining an action that a first object represented by the first portion is undertaking based at least in part on the first synthetic image data and the second synthetic image data.

8. The method of claim 7, further comprising:
determining a third discriminator network corresponding to the action; and
sending the first synthetic image data and the second synthetic image data to the third discriminator network.

9. The method of claim 1, further comprising:
receiving a first cropped image of the first portion, wherein the first cropped image was generated using a camera;
generating a first label for the first cropped image of the first portion indicating that the first cropped image is a real image of a first object;
receiving a second cropped image of the first object, wherein the second cropped image was synthetically generated;
generating a second label for the second cropped image of the first object indicating that the second cropped image is a synthetically-generated image of the first object; and
updating at least one parameter of the first discriminator network using the first cropped image, the second cropped image, the first label, and the second label.

10. A system comprising:
at least one processor; and
non-transitory computer-readable memory storing instructions that, when executed by the at least one processor, are effective to:
generate, by a generator network, first synthetic image data;
detect a first class of image data represented by a first portion of the first synthetic image data;
send the first portion of the first synthetic image data to a first discriminator network, wherein the first discriminator network is associated with the first class of image data;
generate, by the first discriminator network, first data comprising a first prediction of whether the first portion of the first synthetic image data is synthetically generated;
detect a second class of image data represented by a second portion of the first synthetic image data;
send the second portion of the first synthetic image data to a second discriminator network, wherein the second discriminator network is associated with the second class of image data;
generate, by the second discriminator network, second data comprising a second prediction of whether the second portion of the first synthetic image data is synthetically generated;
update at least one parameter of the generator network based at least in part on the first data or the second data; and generate, by the generator network, second synthetic image data.

11. The system of claim 10, the non-transitory computer-readable memory storing further instructions that, when executed by the at least one processor are further effective to:
send the first synthetic image data to a convolutional neural network (CNN);
detect, by the CNN, the first class of image data represented by the first portion of the first synthetic image data;
detect, by the CNN, the second class of image data represented by the second portion of the first synthetic image data;
generate first cropped image data comprising the first portion; and
generate second cropped image data comprising the second portion.

12. The system of claim 10, the non-transitory computer-readable memory storing further instructions that, when executed by the at least one processor are further effective to:
determine that the first discriminator network corresponds to the first class of a first object, wherein the first portion of the first synthetic image data is sent to the first discriminator network based on the determination that the first discriminator network corresponds to the first class of the first object; and
determine that the second discriminator network corresponds to the second class of a second object, wherein the second portion of the first synthetic image data is sent to the second discriminator network based on the determination that the second discriminator network corresponds to the second class of the second object.

13. The system of claim 10, the non-transitory computer-readable memory storing further instructions that, when executed by the at least one processor are further effective to send the first synthetic image data to a third discriminator network, wherein the third discriminator network is trained to predict whether image data representing an ensemble of objects is a real image or a synthetically-generated image.

14. The system of claim 10, the non-transitory computer-readable memory storing further instructions that, when executed by the at least one processor are further effective to:
generate a first vector representation of the first portion;
determine a second vector representation in a multi-dimensional vector space based on a distance between the first vector representation and the second vector representation, wherein the second vector representation corresponds to an item available for purchase via an e-commerce service; and
cause a listing for the item to be shown on a display.

15. The system of claim 10, the non-transitory computer-readable memory storing further instructions that, when executed by the at least one processor are further effective to generate, by the generator network, the second synthetic image data, wherein the first synthetic image data and the second synthetic image data are respective frames of a video.

16. The system of claim 15, the non-transitory computer-readable memory storing further instructions that, when executed by the at least one processor are further effective to determine an action that a first object represented by the first portion is undertaking based at least in part on the first synthetic image data and the second synthetic image data.

17. The system of claim 16, the non-transitory computer-readable memory storing further instructions that, when executed by the at least one processor are further effective to:
- determine a third discriminator network corresponding to the action; and
- send the first synthetic image data and the second synthetic image data to the third discriminator network.

18. A method of generating synthetic images, comprising:
- generating, by a generator network, first synthetic image data;
- detecting a first class of image data represented by a first portion of the first synthetic image data;
- sending the first portion of the first synthetic image data to a first discriminator network, wherein the first discriminator network is associated with the first class of image data;
- generating, by the first discriminator network, first data comprising a first prediction of whether the first portion of the first synthetic image data is synthetically generated;
- detecting a second class of image data represented by a second portion of the first synthetic image data;
- sending the second portion of the first synthetic image data to a second discriminator network, wherein the second discriminator network is associated with the second class of image data; and
- generating, by the second discriminator network, second data comprising a second prediction of whether the second portion of the first synthetic image data is synthetically generated.

19. The method of claim 18, further comprising:
- sending the first synthetic image data to a first machine learning algorithm;
- detecting, by the first machine learning algorithm, the first class of image data represented by the first portion of the first synthetic image data;
- detecting, by the first machine learning algorithm, the second class of image data represented by the second portion of the first synthetic image data;
- generating first cropped image data comprising the first portion; and
- generating second cropped image data comprising the second portion.

20. The method of claim 18, further comprising:
- determining that the first discriminator network corresponds to the first class of a first object, wherein the first portion of the first synthetic image data is sent to the first discriminator network based on the determination that the first discriminator network corresponds to the first class of the first object; and
- determining that the second discriminator network corresponds to the second class of a second object, wherein the second portion of the first synthetic image data is sent to the second discriminator network based on the determination that the second discriminator network corresponds to the second class of the second object.

* * * * *